United States Patent [19]
Marlier et al.

[11] Patent Number: 5,760,364
[45] Date of Patent: Jun. 2, 1998

[54] UNIT FOR PROTECTING A METAL TUBE CONTAINING AT LEAST ONE OPTICAL FIBER AGAINST INTERNAL OVERHEATING, AND A METHOD OF IMPLEMENTING IT

[75] Inventors: Géry Marlier; Albert Picavet, both of Calais, France

[73] Assignee: Alcatel Submarcom, Clichy, France

[21] Appl. No.: 540,079

[22] Filed: Oct. 6, 1995

[30] Foreign Application Priority Data

Oct. 7, 1994 [FR] France ................... 94 11998

[51] Int. Cl.⁶ .................................................. B23K 26/00
[52] U.S. Cl. ............................ 219/121.64; 219/121.63
[58] Field of Search ......................... 219/121.63, 121.64

[56] References Cited

U.S. PATENT DOCUMENTS

| | | | |
|---|---|---|---|
| 4,759,487 | 7/1988 | Karlinski | 219/121.63 |
| 4,811,888 | 3/1989 | Ziemek et al. | |
| 5,210,391 | 5/1993 | Yoshie et al. | 219/121.63 |
| 5,582,748 | 12/1996 | Yoshie et al. | 219/121.64 |
| 5,613,631 | 3/1997 | Ziemek et al. | 219/121.64 |

FOREIGN PATENT DOCUMENTS

| | | |
|---|---|---|
| 0299123A3 | 1/1989 | European Pat. Off. |
| 2517073 | 5/1983 | France. |
| 4328780A1 | 3/1995 | Germany. |

OTHER PUBLICATIONS

*Patent Abstracts of Japan*, vol. 017, No. 242 (P–1535), 14 May 1993 & JP–A–04 365006 (NKK Corp) 17 Dec. 1992.
*Patent Abstracts of Japan*, vol. 017, No. 428 (P–1588), 9 Aug. 1993 & JP–A–05 088060 (NKK Corp) 9 Apr. 199.

*Primary Examiner*—Geoffrey S. Evans
*Attorney, Agent, or Firm*—Sughrue, Mion, Zinn, Macpeak & Seas, PLLC

[57] ABSTRACT

The unit for protecting the inside of a metal tube containing at least one optical fiber against overheating limits the extent to which fibers inserted by an auxiliary tube and filler gel overheat level with the laser welding that closes the metal tube. The unit including a thermal diffuser interposed between the auxiliary tube for inserting fibers and the closure zone that is defined on the metal tube. The invention is applicable to making an underwater optical cable.

8 Claims, 2 Drawing Sheets

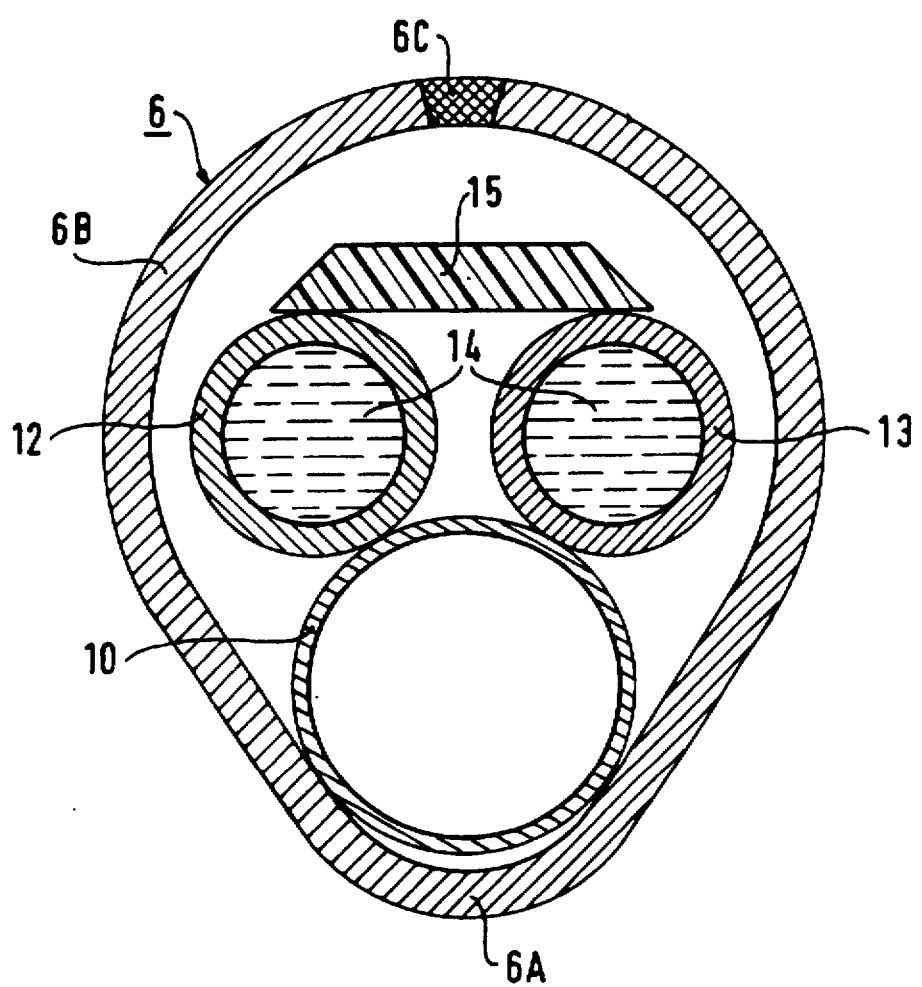

UNIT FOR PROTECTING A METAL TUBE CONTAINING AT LEAST ONE OPTICAL FIBER AGAINST INTERNAL OVERHEATING, AND A METHOD OF IMPLEMENTING IT

The present invention relates to continuously manufacturing a sealed metal tube that contains at least one optical fiber. More particularly, it relates to a unit for protecting such a metal tube against internal overheating, by limiting the amount of the heat which penetrates into the inside of the tube when heat is applied to the tube in order to close it lengthwise. The invention also relates to a method of implementing the unit.

BACKGROUND OF THE INVENTION

Optical transmission fibers, in particular as intended for an underwater optical cable, are commonly installed inside a metal (e.g. steel) tube that provides mechanical protection and sealing around each fiber or around each set of fibers contained within the structure of the cable.

The operation of putting one or more optical fibers into a metal tube is known per se. In particular, it is described in Document EP-A-0 299 123.

It consists in deforming a flat metal tape so as to cause it to take up the shape of an open gutter, in guiding the optical fiber into the open gutter, and then in closing the gutter lengthwise to form a tube around the fiber by using a laser to weld together the edges of the opening. The fiber is guided within the metal tube by means of an auxiliary tube which penetrates into the open metal tube and which extends therein beyond the place where it is being closed by laser.

According to document FR-A-2 517 073, the guide tube for the optical fiber also makes it possible to insert damping material into the metal tube, e.g. a filler gel within which the fiber is embedded in the closed metal tube. Such a guide tube may be a single tube for simultaneously inserting both the fiber and the filler material into the metal tube, or it may be a double-walled tube for inserting the fiber separately via its central channel while simultaneously inserting the filler material via a coaxial peripheral annular channel. The guide tube is made from a material that is capable of withstanding the high temperatures involved in closing the metal tube.

The material of the guide tube may be composite and it may comprise an outer material of low thermal conductivity and an inner material of high thermal conductivity so that any heat energy received and disengaged via the closure point is almost certain not to be transmitted to the internal optical fiber(s) and/or to the damping material.

Such a guide tube is expensive and difficult to make. It does not always provide adequate protection inside the metal tube for ensuring that the inside of the metal tube does not heat up excessively, and this is particularly true when the metal tube is closed by laser welding. In particular, the guide tube is incapable of ensuring that no hydrogen is given off from the filler gel, where any such hydrogen interferes with the transmission characteristics of the optical fibers and increases attenuation of the transmitted optical signal.

According to document U.S. Pat. No. 4,811,888, the metal tube is cooled immediately after being welded lengthwise in order to reduce heating of the metal tube as quickly as possible. Such cooling turns out to be useful but insufficient.

Another known solution for avoiding the unwanted effects of the filler gel being heated due to the tube being welded consists in including therein a chemical substance for absorbing the hydrogen molecules that are given off. That solution is effective but very expensive.

OBJECTS AND SUMMARY OF THE INVENTION

An object of the present invention is to avoid the drawbacks of the above known solutions while providing thermal protection in simple manner for both the optical fibers and for any gel that may be used filling the metal tube.

In association with a stationary laser welding station that defines a closure zone for a metal tube which is driven past said station, and that includes at least one first auxiliary tube serving to guide and insert at least one optical fiber in said metal tube so that the fiber extends along the metal tube beyond said closure zone, the present invention provides a unit for protecting the fiber-containing metal tube against internal overheating, the unit including a thermal diffuser mounted inside said metal tube and interposed between said first auxiliary tube and said closure zone defined on said metal tube at said laser welding station.

This unit advantageously also presents at least one of the following additional characteristics:

said unit is further associated with at least one second auxiliary tube injecting a filler material into said metal tube so that the filler material also extends beyond said closure zone, and wherein said thermal diffuser is carried by said second auxiliary tube(s) and is disposed directly facing said closure zone;

said thermal diffuser is fixed on two of said second auxiliary tubes extending side by side and separating said first auxiliary tube from said thermal diffuser; and said unit further includes a device for cooling the outside of said metal tube and mounted directly downstream from said laser welding station.

The invention also provides a method of implementing said unit, said metal tube being made by deforming an initially flat metal tape, the method consisting: in causing the metal tube as entrained past said laser welding station to have a cross-section that is greater than a final section desired therefor, and is egg-shaped having a "top" first half which is substantially circular and on which said closure zone is centered, and a "bottom" second half which is substantially V-shaped with a semicircular bottom of radius smaller than that of said first half and substantially equal to the radius of said first auxiliary tube that is received therein;. and in reducing the egg-shaped section and making it circular beyond the ends of the auxiliary tubes within said metal tube.

BRIEF DESCRIPTION OF THE DRAWINGS

The characteristics and advantages of the present invention appear from the following description of an embodiment illustrated in the accompanying drawings. In the drawings:

FIG. 2 is a cross-section view of said metal tube where it is being closed.

MORE DETAILED DESCRIPTION

Figure 1:
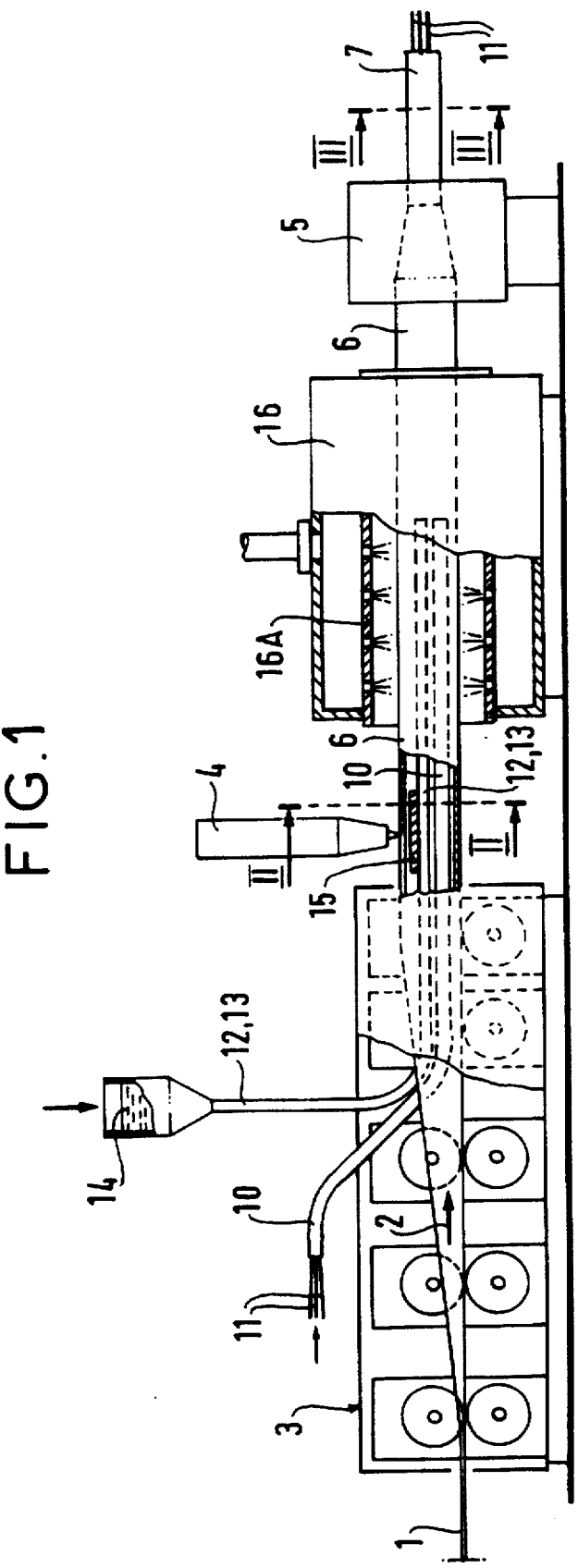
FIG. 1 is a diagrammatic fragmentary view of a line for putting optical fibers into a metal tube, which line is fitted with a protection unit of the invention for limiting internal heating of the metal tube as a result of the tube being closed by welding.

With reference to FIG. 1, a flat stainless steel tape 1 runs continuously in the direction of arrow 2 through a unit 3 comprising sets of rollers that deform it progressively so as to convert it into a tube shape, after which it runs past a laser welding torch 4 that provides sealed closure along the metal tube, and it then passes through a die 5 for bringing the tube into a desired final shape.

The flat tape is taken from a storage reel (not shown) and is naturally appropriately degreased prior to being shaped as a tube. It is also mentioned that the tape is driven in the direction of arrow 2 by means situated upstream from the assembly 3 and made up of sets of deformation rollers, and also by means situated downstream from the final shaping die 5 or constituted by said die. The tube leaving the die 5 is stored on a take-up spool.

For better understanding, the tube closed by the laser torch 4 is given reference 6 and the final tube obtained at the outlet from the die 5 is given reference 7.

A capillary type first auxiliary tube 10 is used for guiding and inserting optical fibers 11 inside the metal tube 6.

At a point between sets of rollers in the assembly 3, the auxiliary tube penetrates into the metal tube which is still wide open at said point. It extends to a point inside the closed tube 6 beyond the zone where it is closed by means of the laser torch 4.

A second capillary type auxiliary tube 12, or preferably two identical second auxiliary tubes 12 and 13 (as can be seen in FIG. 2) also penetrate into the metal tube where it is still wide open and they extend side by side inside the closed tube 6 beyond the zone where it is closed by the laser torch. These tubes are used for injecting a filler gel 14 into the tube 6, so that the fibers are completely embedded in the gel in the resulting final tube 7.

These tubes 10, 12, and 13 are preferably made of stainless steel.

With reference also to FIG. 2, it can be seen that the unit for protecting the inside of the metal tube 6 against overheating where the laser torch is applied is essentially constituted by a heat diffuser 15 located inside the metal tube and situated between the auxiliary tubes 10 and 12 and the zone where the metal tube 6 is closed. The diffuser extends transversely and longitudinally in both directions from the closure zone.

It is preferably constituted by a plate of a material that is a good conductor of heat, and in particular copper. It is fixed to the two second capillary tubes 12 and 13 for injecting the filler gel, e.g. by being welded thereto where they face the closure zone, and is thus fixed to their sides remote from the capillary tube 10 for guiding and inserting fibers, which tube is beneath the auxiliary tubes 12 and 13 within the metal tube 6.

The diffuser receives energy coming from the laser torch in an "impact" zone thereof, and it distributes this energy over its entire area and throughout its thickness. This has the effect of reducing the maximum temperature value in the impact zone compared with a closure system having a laser torch of the same energy but not including such a diffuser. The resulting maximum temperature thus remains below the temperature threshold at which the phenomenon begins whereby hydrogen is given off in the filler gel.

This protection unit advantageously also includes an external device 16 for cooling the metal tube 6 and situated immediately downstream from the laser welding torch 4, as shown in FIG. 1. This device constitutes an annular enclosure mounted around the metal tube 6 and fitted with strips of nozzles 16A for forcing cooing air or water over the periphery of the metal tube, or at least over the closure line thereof and over peripheral portions on either side of said line. In a variant, it could be constituted by an enclosure through which the metal tube passes and in which a cooling fluid is caused to circulate and/or in which one or more cooling strips of nozzles are provided.

This protection unit having an internal diffuser level with the laser torch and external cooling downstream therefrom makes it possible to use a standard filler gel that does not include any hydrogen-absorbing chemical additive. It provides sufficient protection to avoid hydrogen molecules being given off within the gel.

It enables the optical fibers in their auxiliary tube located beneath the two auxiliary tubes 12 and 13 and the diffuser to be provided with excellent protection since they are thus kept very far away from the closure zone of the metal tube. This prevents the fibers being degraded and consequently prevents any resultant increase in the optical attenuation of the signals that are subsequently conveyed thereby. It also makes it possible to manufacture a very long length of metal tube containing optical fibers embedded in filler gel continuously and at high speed, with such a tube being suitable for use in manufacturing an underwater optical cable for a very long distance link.

In addition, as shown in FIG. 2, for particularly effective implementation of the protection unit, and more specifically of the thermal diffuser 15, the tube 6 shaped from the initial flat tape and closed by the laser torch is given a section which is firstly greater than the section desired for the final tube 7 and which is secondly egg-shaped rather than being the circular shape which is desired for the final tube 7 on leaving the die 5 in FIG. 1. The final tube is given the desired smaller and circular section within the die which is situated downstream from the ends of the auxiliary tubes 10, 12, and 13 within the metal tube.

In section, the tube 6 has a "bottom" half 6A which is substantially V-shaped with a rounded bottom whose radius is very little greater than that of the auxiliary tube 10, with said auxiliary tube 10 being received therein and resting substantially on the bottom of the V-shape, and it also has a "top" half 6B having the line of closure 6C of the tube centered therein and which is substantially circular but having a radius that is considerably greater than that of the bottom portion. The auxiliary tubes 12 and 13 are received substantially in the middle portion of the metal tube 6, resting against the periphery of the auxiliary tube 10.

The thermal diffuser 15 is fixed to the auxiliary tubes 12 and 13 and is thus relatively remote from the closure line made by the laser torch. Consequently it keeps the auxiliary tubes 12 and 13 and the auxiliary tube 10 away from the closure zone.

We claim:

1. A unit for protecting a metal tube against internal overheating at a stationary laser welding station that defines a closure zone on said metal tube which is driven past said station, and that includes at least one first auxiliary tube serving to guide and insert at least one optical fiber in said metal tube so that the fiber extends along the metal tube beyond said closure zone, the unit including a thermal diffuser mounted inside said metal tube and interposed between said first auxiliary tube and said closure zone defined on said metal tube at said laser welding station.

2. A unit according to claim 1, further associated with at least one second auxiliary tube injecting a filler material into said metal tube so that the filler material also extends beyond said closure zone, where said thermal diffuser is carried by said at least one second auxiliary tube and is disposed directly facing said closure zone.

3. A unit according to claim 2, wherein there are two of said second auxiliary tubes extending side by side and separating said first auxiliary tube from said thermal diffuser, and wherein said thermal diffuser is fixed on said two second auxiliary tubes.

4. A unit according to claim 1, wherein said thermal diffuser is a plate of a material that is a good conductor of heat.

5. A unit according to claim 1, further including a device for cooling the outside of said metal tube and mounted directly downstream from said laser welding station.

6. A method of implementing a unit for protecting a metal tube against internal overheating at a stationary laser welding station that defines a closure zone on said metal tube which is driven past said station, said unit including at least one first auxiliary tube serving to guide and insert at least one optical fiber in said metal tube so that the fiber extends along the metal tube beyond said closure zone, the unit including a thermal diffuser mounted inside said metal tube and interposed between said first auxiliary tube and said closure zone defined on said metal tube at said laser welding station, said metal tube being made by deforming an initially flat metal tape, the method comprising the steps of:

causing the metal tube as entrained past said laser welding station to have a cross-section that is greater than a final section desired therefor, and wherein said cross-section is egg-shaped having a "top" first half which is substantially circular and on which said closure zone is centered, and a "bottom" second half which is substantially V-shaped with a semicircular bottom of radius smaller than that of said first half and substantially equal to the radius of said first auxiliary tube that is received therein; and reducing the egg-shaped section and making it circular beyond the ends of the auxiliary tubes within said metal tube.

7. A unit for protecting a metal tube against internal overheating at a stationary laser welding station that defines a closure zone on said metal tube which is driven past said station, and that includes at least one first auxiliary tube serving to guide and insert at least one optical fiber in said metal tube so that the fiber extends along the metal tube beyond said closure zone, and two second auxiliary tubes extending side by side between said first auxiliary tube and said closure zone and injecting a filler material into said metal tube so that the filler material also extends beyond said closure zone, the unit including a thermal diffuser fixed on said two second auxiliary tubes directly facing said closure zone and interposed between said first auxiliary tube and said closure zone.

8. A unit for protecting a metal tube against internal overheating at a stationary laser welding station that defines a closure zone on said metal tube which is driven past said station, and that includes at least one first auxiliary tube serving to guide and insert at least one optical fiber in said metal tube so that the fiber extends along the metal tube beyond said closure zone, the unit including a thermal diffuser mounted inside said metal tube and interposed between said first auxiliary tube and said closure zone defined on said metal tube at said laser welding station, wherein said thermal diffuser is a plate of a material that is a good conductor of heat.

* * * * *